Nov. 22, 1966 L. B. SCOTT 3,287,544

BIDIRECTIONAL COUNTER

Filed March 11, 1963 4 Sheets-Sheet 1

INVENTOR.
Larkin B. Scott
BY
Andrew L. Ney
ATTORNEY.

Nov. 22, 1966 L. B. SCOTT 3,287,544

BIDIRECTIONAL COUNTER

Filed March 11, 1963

4 Sheets-Sheet 2

INVENTOR.
Larkin B. Scott
BY Andrew L. Ney
ATTORNEY.

Nov. 22, 1966 L. B. SCOTT 3,287,544

BIDIRECTIONAL COUNTER

Filed March 11, 1963 4 Sheets-Sheet 3

INVENTOR.
Larkin B. Scott
BY
Andrew L. Hey
ATTORNEY.

INVENTOR.
Larkin B. Scott
BY
Andrew L. Ney
ATTORNEY 3,287,544

BIDIRECTIONAL COUNTER

Larkin Burneal Scott, Fort Worth, Tex., assignor to The Perkin-Elmer Corporation, Norwalk, Conn., a corporation of New York Filed Mar. 11, 1963, Ser. No. 264,139
9 Claims. (Cl. 235—92)

*General*

The present invention relates to a bidirectional counter capable of counting according to any presently known number system. Although the invention will be described as performing counting in accordance with the binary number system it will be obvious that the principles set forth may be applied equaly to a tertiary, decimal or other number system. Where appropriate, reference will be made as to how the invention may be adapted to number systems other than the binary number system. Furthermore, while the invention will be described as utilizing electronic components to perform the counting, it will be obvious that the desired functions may be performed by equivalent mechanical devices.

At the present time many two directional electronic counting operations are performed by the so called up-down or reversible counters. These counters are generally composed of the ordinary binary counter components such as flip-flops or equivalent memory elements plus auxiliary gating circuits. While one is inclined to think of the ordinary binary counter as requiring but a single memory element or flip-flop per bit, in reality there must always be auxiliary memory of some sort to remember the original state of the flip-flop and to control the gating of signals during transition of the flip-flop from one state to the other. Most commonly this auxiliary memory function is constituted by the action of certain capacitors in the circuit. The fact that the memory provided by these capacitors is terminated with the passage of time leads to the imposition of certain requirements on the wave shape of the input and interstage signals, primarily on the rise time of these signals. Thus, the up-down or reversible counters have inherent limitations and shortcomings due to the transients created by the components which are used. Furthermore, the auxiliary gating circuitry itself is often times extremely complex.

A second class counter presently being used to perform two directional counting employs a concept known as positive memory. Every memory function necessary to counter operation is performed by a bi-stable circuit such as a flip-flop under positive control by the counter action. These counters have no dependence on time constants as such and are insensitive to wave shapes. This permits direct coupling thus avoiding the use of capacitors entirely. While positive memory counters do not suffer from inherent transient conditions, they are a great deal more complex in construction and operation than the up-down or reversible counters.

It is an object of the present invention to provide a new and improved bidirectional counter.

It is another object of the present invention to provide a bidirectional counter not subject to the shortcomings and limitations existing in presently used two-directional counters. In particular, a counter constructed in accordance with the present invention is not dependent on time constants in the circuitry. Furthermore, such a counter is simple to construct and inexpensive to fabricate.

A bidirectional counter stage for a number system having the radix R constructed in accordance with the present invention comprises means for translating an N state driving function and a multi-stable device responsive to the driving function and having RN internal stable states which are traversed once in a predetermined sequence for every R traversals of the N states of the driving function. Each successive 1/R of the internal stable states represents a different value in the number system. For the foregoing, R is any number greater than 1 and N is any number greater than 2.

A bidirectional counter for a number system having the radix R constructed in accordance with the present invention comprises a plurality of counter stages, each stage including means for translating an N state driving function and a multi-stable device responsive to the driving function and having RN internal stable states which are traversed once in a predetermined sequence for every R traversals of the N states of the driving function. Each successive 1/R of the internal stable states of each multi-stable device represents a different value in the number system and N groups of R successive internal stable states of each multi-stable device is representative of the N state driving function for the next succeeding stage. The bidirectional counter constructed in accordance with the present invention further includes means for supplying an N state input function to the translating means of the first counter stage and means interposed between the plurality of counter stages for deriving an N state driving function from each counter stage and for coupling it to the next succeeding stage. For the foregoing, R is any number greater than 1 and N is any number greater than 2.

For a better understanding of the present invention, together with other and further objects thereof, reference is had to the following description, taken in connection with the accompanying drawings, and its scope will be pointed out in the appended claims.

Referring to the drawings:

FIGURE 1*a* is a simplified representation of one counter stage of a bidirectional counter constructed in accordance with the present invention;

FIGURE 1*b* is a schematic diagram showing the details of a portion of the counter stage of FIGURE 1*a*;

FIGURE 2 is a simplified representation of a two stage bidirectional counter constructed in accordance with the present invention;

FIGURES 3*a* through 3*d* are useful in understanding the basic mode of operation of the two stage bidirectional counter of FIGURE 2;

FIGURES 4*a* through 4*c* inclusive, are useful in understanding the manner in which a bidirectional counter constructed in accordance with the present invention may be reset with any arbitrary number;

*Description and operation of a bidirectional counter stage*

Figures 3A, 3B, 3C, 3D:
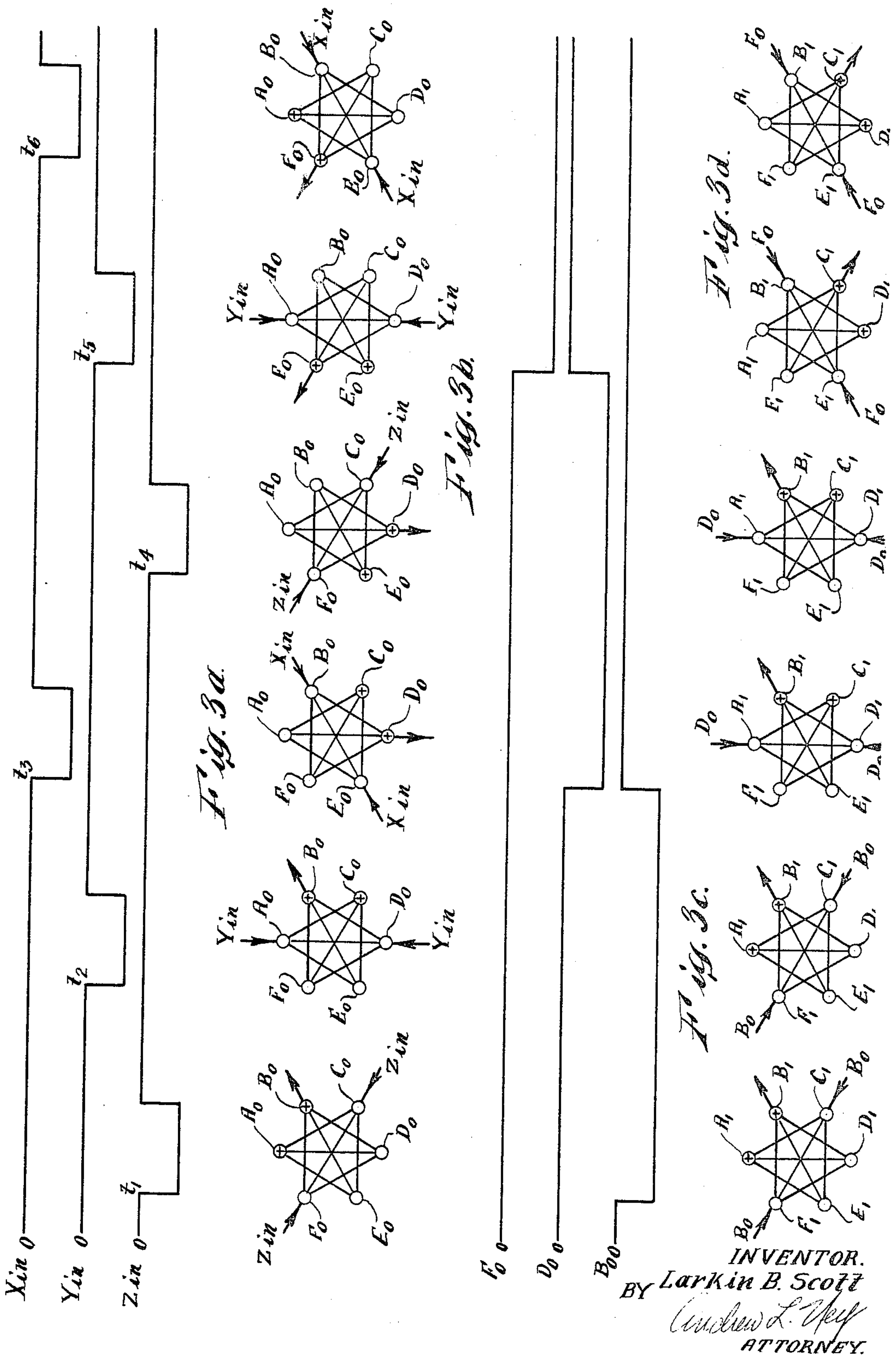

A bidirectional counter stage constructed in accordance with the present invention includes means for translating an N state driving function. In order for a counter to sense changes in direction and count in two directions, it is necessary that the driving function for each counter stage have more than two states. A two state driving signal would not be sufficient to impart a sense of direction for when an arbitrary starting point is chosen in one state, the second state will necessarily follow the chosen state regardless of direction. Thus, for a counter according to the present invention N is any number greater than two. N is preferably equal to three and will be such for the embodiment to be described. It will be apparent, however, that a counter may be constructed according to the present invention utilizing a four or higher state driving function, but in such a case, the cost and complexity of the counter is increased. A typical three state driving function which may be utilized is shown in FIGURE 3*a* and the means for translating this function may include lines X, Y and Z of FIGURE 1*a*. Signal $X_{in}$ is translated along line X; signal $Y_{in}$ is translated along line Y; and signal $Z_{in}$ is translated along line Z.

A bidirectional counter stage constructed in accordance with the present invention further includes a multi-stable device responsive to the driving function and having RN internal stable states which are traversed once in a predetermined sequence for every R traversals of the N states of the driving function. When the counter is designed to count according to the binary number system and is being driven by a three state signal the multistable device has six internal stable states since R is equal to two and N is equal to three. The six internal stable states are traversed once for every two traversals of the three state driving signal. The multi-stable device may be composed of six variable conductivity circuits, each represented by one of the circles A through F, inclusive, in FIGURE 1*a*. The variable conductivity circuits may be NOR circuits such as the ones shown in FIGURE 1*b*. Referring to FIGURE 1*b* the NOR circuits may include a PNP transistor 10 having an emitter electrode 10*a* directly connected to ground, a collector electrode 10*b* connected to a source of potential 11 through a resistor 12 and a base electrode 10*c* connected to a source of positive potential 13 through a resistor 14. The NOR circuits are adapted to receive four input signals through resistors 15, 16, 17 and 18 and to provide an output along three output lines 30, 31 and 32.

A single negative input signal on any of the input lines is sufficient to render the NOR circuit conductive and while conductive the collector electrode 10*b* is approximately at ground potential. In the absence of a negative input signal to any of the inputs the NOR circuit is nonconductive and while nonconductive the collector electrode 10*b* is at a negative potential approximately equal to the value of source 11. The NOR function of each NOR circuit may, accordingly, be stated as follows: Whenever a negative input signal is applied to any of the inputs of the NOR circuit, the output of the NOR circuit is approximately equal to ground potential. Whenever there are no negative input signals applied to any of the inputs of the NOR circuit, the output of the NOR circuit is at a negative potential.

Figure 1A:
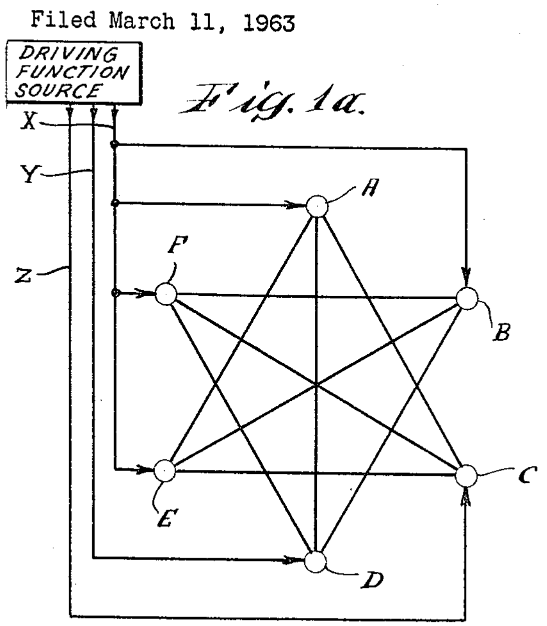
Figure 1B:
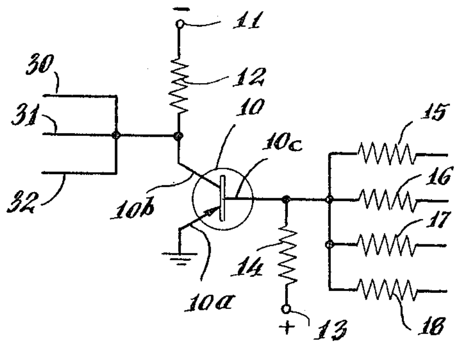

The six NOR circuits in FIGURE 1*a* are so interconnected that each of the circuits has its output connected to the inputs of three of the other circuits and its input is connected to the output of the same three circuits. In particular, the input lines having resistors 15, 16 and 17 of FIGURE 1*b* may be connected to the outputs of three of the other NOR circuits, while the input line having resistor 18 may represent one of the signal translating lines X, Y or Z. The solid lines joining the various NOR circuits in FIGURE 1*a* are intended to represent the construction whereby the output of each NOR circuit is fed back to the input of three others.

The interconnections between the inputs and outputs of the six NOR circuits are effective to place two of the NOR circuits in a first state of conductivity and the other NOR circuits in a second state of conductivity. In particular, two of the NOR circuits are nonconductive and the other four are conductive. This condition exists for each of the six internal stable states of the counter stage composed of the six NOR circuits. The six internal stable states differ from each other only by the particular NOR circuits which are nonconductive or conductive.

In order to show that for each of the internal stable states of the counter stage of FIGURE 1*a* two of the NOR circuits are nonconductive and the other four are conductive, assume, for example, that NOR circuits A and F are nonconductive. If this is so, both of these NOR circuits will provide negative output signals to NOR circuits B, C, D and E since NOR circuits B, C, D and E have their inputs connected to the outputs of NOR circuits A and F. NOR circuits B, C, D and E, receiving negative input signals, will, therefore, be rendered conductive since a single negative input signal to a NOR circuit is sufficient to render that NOR circuit nonconductive. Since NOR circuits B, C, D and E are conductive they will, in turn, furnish output signals approximately equal to ground potential to all three of the inputs of both of the NOR circuits A and F. Since none of the inputs in NOR circuits A and F are negative both of these NOR circuits are, in fact, nonconductive.

Continuing with the assumption that NOR circuits A and F are nonconductive and NOR circuits B, C, D and E are conductive, when a negative driving signal is supplied along line Z to NOR circuit F this NOR circuit is rendered conductive and NOR circuits B, C and D having their inputs connected to the output of NOR circuit F are no longer held conductive because of NOR circuit F since NOR circuit F now supplies an output signal approximately equal to ground potential. The fourth originally conductive NOR circuit, namely NOR circuit E, still receives a negative input signal from the output of NOR circuit A and NOR circuit E is, therefore, maintained conductive. Of the three NOR circuits B, C and D which are no longer held conductive because of the action of NOR circuit F, two, namely C and D, are still held conductive because of the negative signals still being supplied to their inputs from the output of NOR circuit A. Since NOR circuits D, E and F are conductive they all supply output signals approximately equal to ground potential to the inputs of NOR circuit B. Since none of the inputs to NOR circuit B are negative this NOR circuit is rendered nonconductive and provides a negative output signal to the inputs of NOR circuits D, E and F thereby holding these NOR circuits conductive.

As negative driving signals are sequentially supplied along translating lines Z, Y and X, for example, according to the three state signal of FIGURE 3*a* to each of the NOR circuits A through F inclusive, the states of conductivity of the NOR circuits are cyclically altered in the manner just described. It will be seen that the six internal stable states of the counter stage of FIGURE 1*a* are traversed once for every two traversals of the three state input signal. As will be brought out in more detail below, a first successive half of the internal stable states will represent a binary "0" while the second successive half of the internal stable states will represent a binary "1." For a number system having the radix R and a counter stage being supplied with an N state driving function each successive 1/R of the internal stable states is representative of a different value in the number system. For example, a counter stage used to count values in the decimal system and being supplied by a three state driving signal would have thirty internal stable states. Each successive tenth of the internal stable states would represent a different value in the decimal system. For example the first tenth may represent "0," the second tenth may represent "1," the third tenth may represent "2," the fourth tenth may represent "3," and so on.

*Description and operation of the bidirectional counter*

Figure 2:
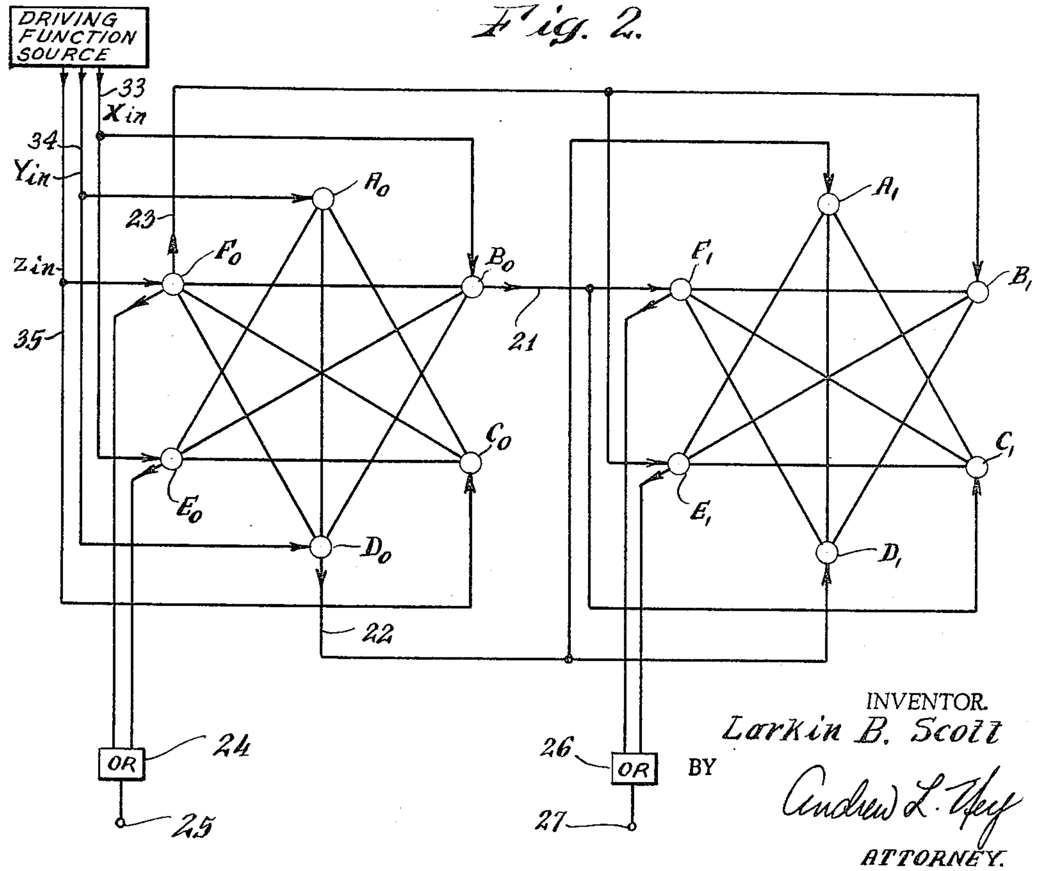

FIGURE 2 shows a two stage bidirectional counter constructed in accordance with the present invention. Each counter stage is seen to be similar to the counter stage shown in FIGURE 1*a*. The counter stage composed of NOR circuits $A_0$ through $F_0$, inclusive, corresponds to the least significant binary digit while the stage composed of NOR circuits $A_1$ through $F_1$, inclusive, corresponds to the next most significant binary digit. It is obvious that for additional binary digits additional counter stages such as the ones shown in FIGURE 1*a* would be added on in cascade in the manner shown in FIGURE 2.

The bidirectional counter of FIGURE 2 includes means for supplying an N state input function to the first counter stage. The input function may be the three state signal represented by the wave forms of FIGURE 3*a* and this signal may be supplied along input lines 33, 34 and 35 to NOR circuits $A_0$ through $F_0$.

FIGURE 3*b* shows the cyclic variation of the conductivity states of the NOR circuits in the first binary digit stage when the stage is supplied with the three state signal shown in FIGURE 3*a*. Each of the stage conditions represented in FIGURE 3*b* corresponds to the condition which exists at the time that the negative input pulses shown immediately above in FIGURE 3*a* are applied to the first binary digit stage. In particular, the circles in FIGURE 3*b* having crosses signify which NOR circuits are nonconductive immediately after the input pulse directly above it has been received by the first binary digit stage.

Assuming that NOR circuits $A_0$ and $F_0$ are initially nonconductive, when a negative input pulse of the $Z_{in}$ signal is supplied at time $t_1$ to NOR circuit $F_0$, NOR circuit $F_0$ is rendered conductive and NOR $B_0$ is rendered nonconductive. This negative input pulse is also supplied to NOR circuit $C_0$, but because NOR circuit $C_0$ is already conductive it is not affected. When a negative input pulse of the $Y_{in}$ signal is supplied at time $t_2$ to NOR circuit $A_0$, NOR circuit $A_0$ is rendered conductive and NOR circuit $C_0$ is rendered nonconductive. This negative input pulse is also supplied to NOR circuit $D_0$, but because NOR circuit $D_0$ is already conductive it is not affected. When a negative input pulse of the $X_{in}$ signal is supplied at time $t_3$ to NOR circuit $B_0$, NOR circuit $B_0$ is rendered conductive and NOR circuit $D_0$ is rendered nonconductive. This negative input pulse is also supplied to NOR circuit $E_0$, but because NOR circuit $E_0$ is already conductive it is not affected. As this example is carried on, it will be seen that two complete cycles of the three state input signal are necessary to traverse the six internal stable states of the first binary digit stage.

FIGURE 3*c* shows wave forms representative of the potential variations at the outputs of NOR circuits $B_0$, $D_0$, and $F_0$ as the conductivity states of these NOR circuits are altered by the application of two cycles of the three state input signal. NOR circuit $B_0$, being nonconductive during the interval $t_1$ to $t_3$, has its output at a negative potential for this period. Thereafter, NOR circuit $B_0$ is conductive and its output during this period is at approximately ground potential. NOR circuit $D_0$, being nonconductive during the interval $t_3$ to $t_5$, has its output at a negative potential for this period. Before time $t_3$ and after time $t_5$ NOR circuit $D_0$ is conductive and its output during these periods is at approximately ground potential. NOR circuit $F_0$, being nonconductive during the interval between time $t_5$ and the beginning of the third cycle of the three state input signal, has its output at a negative potential for this period. Before time $t_5$ NOR $F_0$ is conductive and its output during this period is at approximately ground potential. It will be noted that the three signals at the outputs of NOR circuit $B_0$, $D_0$ and $E_0$, as represented by the wave forms of FIGURE 3*c*, also have the same relative phasing with each other as the three state input function but that the frequency of these output signals is half the frequency of the three state input signal. Each negative pulse of the three state signal represented by the wave forms of FIGURE 3*c* exists for an interval corresponding to the time during which the first binary digit stage resides in two of its six internal stable states. A general statement describing this behavior of the first binary digit stage is that a three state signal may be derived from the first binary digit stage by sensing three pairs of successive internal stable states of the stage. For a binary counter stage being driven by an N state input signal N pairs of successive internal stable states can be sensed to derive an N state signal. For a counter stage for a number system having the radix R and being driven by an N state driving function, N groups of R successive internal stable states can be sensed to derive an N state signal. For example, for a counter stage used to count according to the decimal number system and being driven by a three state signal, three groups of ten successive internal stable states can be sensed to derive a three state output signal.

The three signals represented by the wave forms of FIGURE 3*c* are used as the three state signal to drive the next succeeding binary digit stage. In other words this three state signal is used to cyclically alter the conductivity states of the NOR circuits $A_1$ through $F_1$, inclusive. Accordingly, a bidirectional counter constructed in accordance with the present invention includes means interposed between the plurality of counter stages for deriving an N state driving function from each counter stage and for coupling it to the next succeeding stage. The coupling means as shown in FIGURE 2 are composed of a first wire 21 connected between the output of NOR circuit $B_0$ and the inputs of NOR circuits $C_1$ and $F_1$, a second wire 22 connected between the output of NOR circuit $D_0$ and the inputs of NOR circuits $A_1$ and $D_1$ and a third wire 23 connected between the output of NOR circuit $F_0$ and the inputs of NOR circuits $B_1$ and $E_1$. It should be pointed out that wires 21, 22 and 23 are connected to oppositely disposed NOR circuits in the second binary digit stage in the same manner as input wires 33, 34 and 35 are connected to oppositely disposed NOR circuits in the first binary digit stage.

FIGURE 3*d* shows the cyclic variation of the conductivity states of the secondary binary digit stage when it is supplied when a three state driving signal such as the one represented by the wave form of FIGURE 3*c*. Again the circles having crosses signify which circuits are nonconductive immediately after the driving pulse directly above it has been received by the second digit stage. It will be seen that when one complete cycle of the three state driving signal represented by the wave form in FIGURE 3*c* is supplied, the second binary digit stage traverses three of its six stable states. The second binary digit stage must also receive two complete cycles of its driving signal in order to traverse its six stable states. Thus, after four complete cycles of the three state input signal represented by the wave form of FIGURE 3*a*, the first binary digit stage traverses its six stable stages twice while the second binary digit stage traverses its six stable states once. This two to one relationship between adjacent binary digit stages corresponds to the basic mode of operation of a binary counter. When additional binary digits are necessary to adequately represent the value of the input function and additional binary digit stages are added in cascade to those shown in FIGURE 2, the same two to one relationship exists between adjacent stages.

As previously mentioned, the first successive half of the internal stable states of each stage represents a binary "0" while the second successive half of the internal states represents a binary "1." It will be seen from FIGURE 3*b* that during the first three internal stable states of the first stage NOR circuits $E_0$ and $F_0$ are conductive. During the last three internal stable states either or both of the NOR circuits $E_0$ and $F_0$ are nonconductive. Thus, binary information may be extracted from each counter stage by sensing the conductivity states of NOR circuits $E_0$ and $F_0$. This may be accomplished by coupling the outputs of NOR circuits $E_0$ and $F_0$ through a conventional OR circuit 24 to a binary output terminal 25. Whenever either of the NOR circuits $E_0$ or $F_0$ are nonconductive a negative output signal will appear at binary output terminal 25. This condition of the first binary digit stage will be deemed to correspond to a binary "1." Whenever both of the NOR circuit $E_0$ and $F_0$ are conductive, a potential approximately equal to ground will appear at binary output terminal 25. This condition of the first binary digit stage will be deemed to correspond to a binary "0." The outputs of NOR circuits $E_1$ and $F_1$ are likewise coupled through an OR circuit 26 to a binary output terminal 27. Whenever a negative signal appears at binary output terminal 27 of the second binary digit stage this will be deemed to correspond to a binary "1" and whenever a potential approximately equal to ground appears at binary output terminal 27 this will be deemed to correspond to binary "0."

To aid in understanding how the counting function of the invention is accomplished and how useful binary information is extracted, assume that each cycle of the three state input signal represented by the wave forms in FIGURE 3*a* corresponds to one revolution of a rotating shaft. Until a negative input pulse of the $Z_{in}$ signal is supplied at time $t_4$ both the NOR circuits $E_0$ and $F_0$ are conductive and the potential at binary output terminals 25 is approximately equal to ground thereby indicating that the first binary digit stage is in the binary "0" state. When a negative input pulse of the $Z_{in}$ signal is supplied at time $t_4$ NOR circuit $E_0$ is rendered nonconductive and a negative signal appears at binary output terminal 25 indicating that the first binary digit stage is in the binary "1" state. When a negative input pulse of the $Y_{in}$ signal is supplied at time $t_5$ NOR circuit $F_0$ is rendered nonconductive and a negative signal continues to appear at binary output terminal 25 indicating that the first binary digit stage is still in the binary "1" state. When a negative input pulse of an $X_{in}$ signal is supplied at time $t_6$ NOR circuit $E_0$ is rendered conductive but NOR circuit $F_0$ remains nonconductive. The negative signal continues to appear at binary output terminal 25 indicating that the first binary digit stage is still in the binary "1" state. Thus, all throughout the second cycle of the three state input signal, this corresponding to the second revolution of the rotating shaft, the indication at binary output terminal 25 is that the first binary digit stage is in the binary "1" state. Since throughout this period NOR circuits $E_1$ and $F_1$ of the second binary digit stages are conductive, as seen in FIGURE 3*d*, a potential approximately equal to ground appears at binary output terminal 27 indicating that the second binary digit stage is in the binary "0" state. Up to the completion of the negative input pulse supplied at time $t_6$ the binary output of the bidirectional counter indicates that one revolution of the rotating shaft has been counted. When a negative input pulse of the $Z_{in}$ signal of the third cycle (not shown) is supplied to the first binary digit stage NOR circuit $F_0$ is rendered conductive. Now a potential approximately equal to ground appears at binary output terminal 25 since both of the NOR circuits $E_0$ and $F_0$ are conductive. This indicates that the first binary digit stage is now in the binary "0" state. However, at the time the negative input pulse of the third cycle of the $Z_{in}$ signal is supplied NOR circuit $E_1$ of the second binary digit stage is rendered nonconductive so that a negative potential appears at binary output terminal 27 thereby indicating that the second binary digit stage is now in the binary "1" state. Now the binary output of the bidirectional counter indicates that two revolutions of the rotating shaft has been counted since the output from the least significant stage is "0" while the output from the next most significant stage is "1." Thus, at the initiation of each cycle of the three state input signal the output of the bidirectional counter indicates the number of revolutions which have already occurred, but does not include the one occurring during the cycle being counted.

Up to this point the description of the operation of the invention has been concerned with the counting of a function in the forward direction. The bidirectional counter constructed in accordance with the present invention counts in an opposite direction in the same way as it does in the forward direction. For example, if revolutions of a rotating shaft are being counted as the shaft rotates in one direction, a reversal in shaft rotation is sensed by the counter so that now it counts in an opposite direction. The change in direction of rotation simply changes the relative phasing of the three state signal representing the rotations of the shaft and the counter simply counts in a reverse direction. By changing the phasing of the three state input signal so that it repeats in an opposite sense, the direction of traversal of the six internal stable states of the first digit state is reversed. This causes a corresponding reversal in the phasing of the signals represented by the wave forms of FIGURE 3*c*. Reversal of these signals causes a corresponding reversal in the traversal of the six internal stable states of the second counter stage. A like effect is carried on throughout all the remaining stages which may be in cascade with the first two stages.

As the function being counted reverses its direction the counter constructed in accordance with the present invention is capable of reversing its counting direction. There is no need to stop the counter and there is no difference in speed of counting in the forward or backward direction. Furthermore, the direction of counting may be reversed without waiting for the previous count to have rippled through all the stages.

Figure 4A:
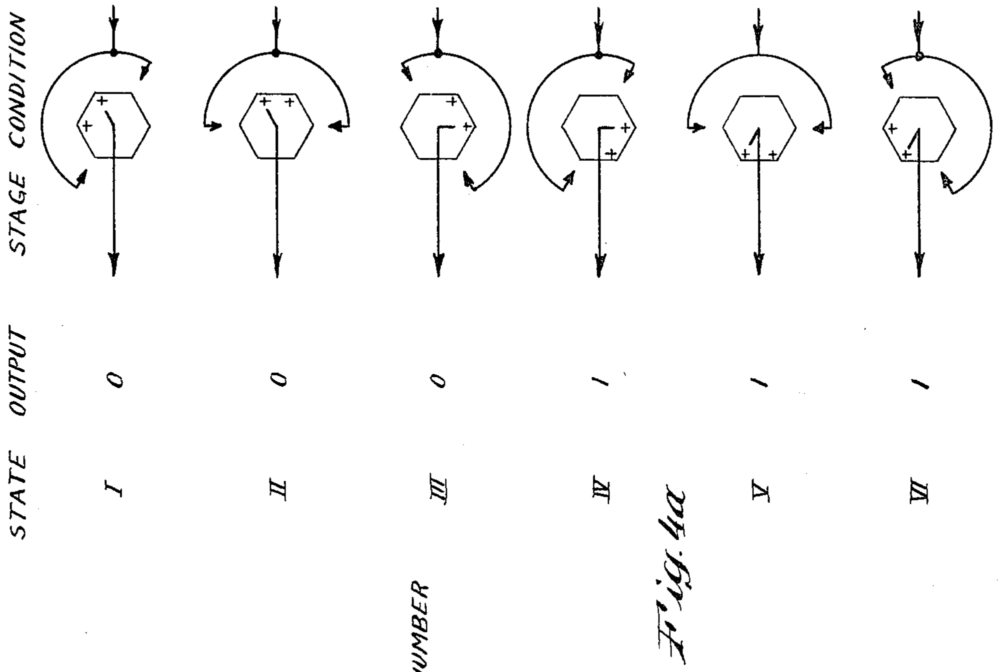
Figure 4B:
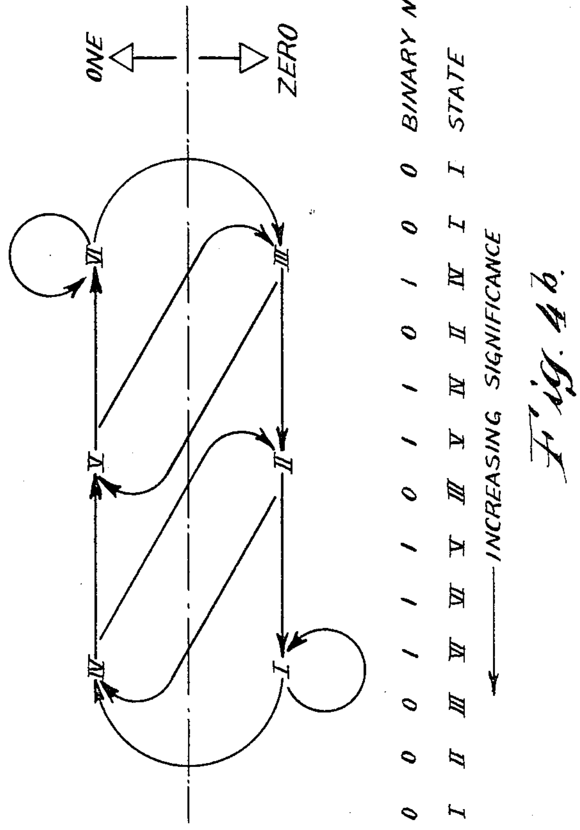

For a binary counter to be fully useful in all applications it should be possible to reset its contents not only to zero, but to any arbitrary number within its operating range. To enter an arbitrary number in the bidirectional counter constructed in accordance with the present invention, each stage must be set to the appropriate one of its six possible internal stable states. As already mentioned, there are three states which may represent a binary "0" and three states which may represent a binary "1." These are illustrated in FIGURE 4*a* where the crosses indicate which NOR circuits are nonconductive for the particular state. The particular states which represent a binary "1" or a binary "0" in any stage depends upon which of the three inputs to that stage is being received from the next previous stage. For example, if the previous stage contains a binary "1" represented by state V, then the input to the following stage would be derived from NOR circuit F. To find out the correct state for all stages when a binary number chosen at random is to be represented, it is necessary to start with the least significant digit and progress in the direction of increasing significance obeying at each stage the conditions set forth in FIGURE 4*a*. This process is simplified by reference to FIGURE 4*b* which is derived by considering which states may follow another. Given some binary number, start with the value of the least significant digit and select the correct state to represent this value depending on the state of the basic input to the counter. Moving only in the direction of the arrows proceed to the state of the next digit as determined by whether its value is a binary "1" or a binary "0" and so on. In this way the states of the various stages may be determined for any number.

Using the above procedure essentially in reverse, it is possible to construct a number having the least number of digits yet which exhibits all of the stage to stage conditions that are possible. To do this, proceed through the diagram shown in FIGURE 4*b* in such a way as to traverse each arrow once and only once. The results of one such excursion are represented in the table in FIGURE 4*b*. It will be found that such a number can be correctly introduced to the contents of the bidirectional counter constructed in accordance with the present invention simply by applying the following rules at each counter stage:

To set a binary "0" NOR circuits A, B, C and D should be rendered conductive.

To set a binary "1" NOR circuits A, D, E and F should be rendered conductive.

Figure 4C:
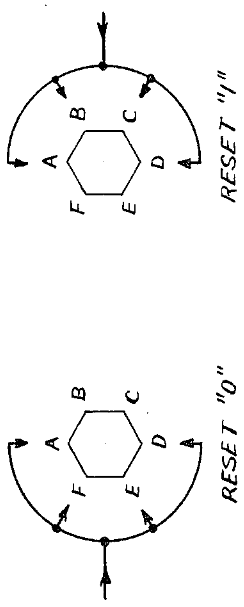

Since the number tried involves all possible stage to stage conditions, it is concluded that the rules set forth above suffice for any number. The reset inputs which carry out these rules are shown in FIGURE 4*c*. It will be seen that when the correct one or the other is superimposed on each stage condition shown in the table in FIGURE 4*b*, the result will be that at least one of the desired NOR circuits is forced into nonconduction in each stage. When the reset inputs are removed every stage will fall into its proper state. It may also be seen that it is not necessary for the reset inputs to appear or disappear all at the same instant, it being sufficient that all are present during an interval longer than a switching time of any one stage. The actual details of the auxiliary circuitry which may be used to accomplish the resetting has been omitted. It is obvious that conventional circuit design techniques may be employed so that when, for example, a push button corresponding to a reset of a binary "0" or a binary "1" is pushed the proper NOR circuits of each stage are rendered conductive or nonconductive.

It is often desired to have the output of a counter appear in some form of a binary coded decimal as opposed to straight binary. For the bidirectional counter constructed in accordance with the present invention, it is convenient to incorporate the familiar 8421 decimal code. For this demical code two additional counter stages having NOR circuits $A_2$ through $F_2$ inclusive and $A_3$ through $F_3$ inclusive would be added in cascade to the two already shown in FIGURE 2. The first decade of the 8421 decimal code is stated for reference as follows:

| | $2^3$ | $2^2$ | $2^1$ | $2^0$ |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 0 | 0 | 0 | 0 | 0 |

Figure 5:
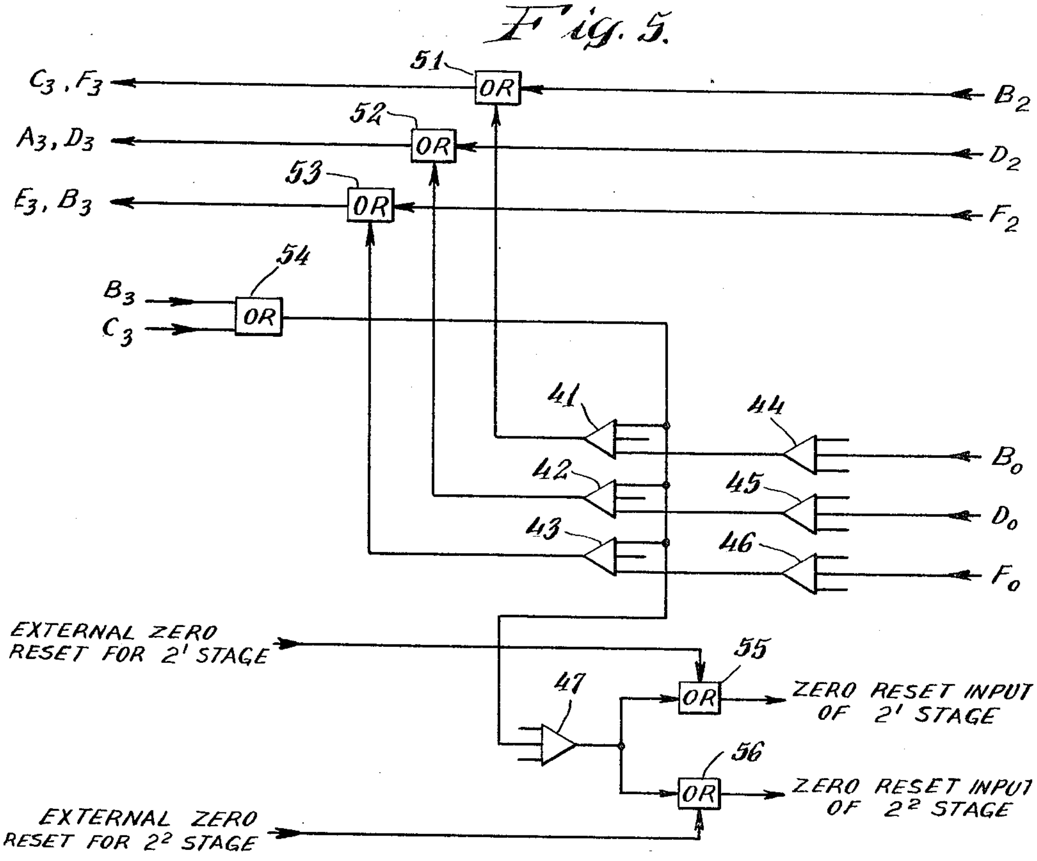
FIGURE 5 is a schematic diagram of an 8421 binary coded decimal adapter.

This code follows the ordinary binary sequence except for the transition between 9 and 0. This departure is provided for in the bidirectional counter constructed in accordance with the present invention by a method wherein the presence of the binary "1" state is sensed in the most significant digit stage ($2^3$) during which time auxiliary gates cause the output of the least significant digit stage ($2^0$) to be transferred to the input of the most significant stage ($2^3$) and the intermediate stages ($2^1$ and $2^2$) are held inactive and in the binary "0" state by energizing their reset to "0" inputs. These provisions cause the most significant digit stage to complete the traversal of its six table states during the counts eight through nine and back to zero so that it generates the required signals to advance the count in the next higher decade. FIGURE 5 shows a circuit which may be used to accomplish these results. This circuit includes a plurality of NOR circuits, 41 through 47 inclusive, each of generally similar construction and operation to the NOR circuit shown in FIGURE 1*b* and a plurality of conventional OR circuits 51 through 56 inclusive. The presence of a binary "1" in the $2^3$ stage may be sensed by monitoring the output of NOR circuits $B_3$ and $C_3$ in the $2^3$ stage. Either or both of these NOR circuits are conductive whenever the $2^3$ stage is in the binary "0" state and while conductive, a negative output signal is supplied by either or both of these circuits through OR circuit 54 to NOR circuits 41, 42 and 43. These negative signals are effective to render NOR circuits 41, 42, and 43 conductive and the output of these NOR circuits are therefore at approximately ground potential regardless of the nature of the signals being supplied to the other input terminals of these NOR circuits. In particular, output signals from NOR circuits $B_0$, $D_0$ and $F_0$ of the $2^0$ stage are inverted by NOR circuits 44, 45, and 46 respectively, and the inverted signals are in turn, respectively coupled to NOR circuits 41, 42, and 43. Thus, while the $2^3$ stage is in the binary "0" state, the output from the $2^0$ stage is not transferred to the $2^3$ stage. During this interval, the outputs from NOR circuits $B_2$, $D_2$, and $F_2$ of the $2^2$ stage are passed by OR circuits 51, 52 and 53, respectively to the appropriate NOR circuits $A_3$ through $F_3$ inclusive of the $2^3$ stage and the $2^3$ stage is driven in the usual manner by the output signals from the $2^2$ stage.

Whenever the $2^3$ stage is in the binary "1" state, NOR circuits $B_3$ and $C_3$ are both conductive and while conductive they provide output signals approximately at ground potential to NOR circuits 41, 42 and 43. This permits the signals coupled from NOR circuits 44, 45 and 46 to be pressed to OR circuits 51, 52 and 53 respectively, but in inverted form, corresponding to their form when supplied from NOR circuits $B_0$, $D_0$ and $F_0$. In other words, whenever a binary "1" is sensed in the $2^3$ stage, the output of the $2^0$ stage is coupled to OR circuits 51, 52 and 53 and this output is in turn passed to the proper NOR circuits $A_3$ through $F_3$ inclusive of the $2^3$ stage. Now the $2^3$ stage being directly driven by the $2^0$ stage passes through the three states corresponding to the binary "1" during the counts eight and nine and back to zero. This action is similar to that which occurs between the $2^0$ and $2^1$ stages during the counts two and three.

Whenever the $2^3$ stage is in the binary "1" state the intermediate significance stages $2^1$ and $2^2$ are held inactive and in the binary "0" state. The output signals provided by NOR circuits $B_3$ and $C_3$ being at approximately ground potential are inverted by NOR circuit 47, coupled through OR circuits 55 adn 56 and appear as negative signals at the zero reset inputs of the $2^1$ and $2^2$ stages.

The same general circuit principles used to develop a binary coded decimal may be employed to derive indications in degrees and minutes. In this case the second decade should only provide counts up to and including five since after fifty-nine minutes the decades representing degrees reflect the completion of a degree. In order to accomplish this result the presence of a binary "1" is sensed in the $2^2$ stage of the second decade and the output of the $2^0$ is transferred to the input of the $2^2$ stage while the $2^1$ stage is held inactive and in the binary "0" state.

At this point it is appropriate to consider in more detail the necessary characteristics of the driving functions. As previously mentioned, the driving function must have at least three states for the counter stages to sense changes in direction. An examination of the three state signal shown in FIGURE 3*a* will reveal that this signal has, in fact, more than three states. For example, the interval between the first negative pulse of signal $Z_{in}$ and the first negative pulse of signal $Y_{in}$ may actually be considered as a state of the driving function. Similar states exist in the intervals between the negative pulses of signal $Y_{in}$ and signal $X_{in}$ and the intervals between the negative pulses of signal $X_{in}$ and signal $Z_{in}$. When reference is made to the states of the driving function in this specification and the appended claims, it is intended to apply to those states of the driving functions which are effective to cause changes in the internal stable states of the multistable devices to which the driving functions are applied. If the duration of the negative pulses were increased so as to occupy the intervals just considered, the resulting driving function would be similar to the three state driving function represented by the wave forms of FIGURE 3*c* and would, therefore, be effective in altering the internal stable states of the multi-stable device of FIGURE 1*a*. In fact, there is no requirement that the driving signals $X_{in}$, $Y_{in}$ and $Z_{in}$ occur without any overlap of the negative pulses. The only restriction is that all three negative pulses must never overlap at once.

Figure 6:
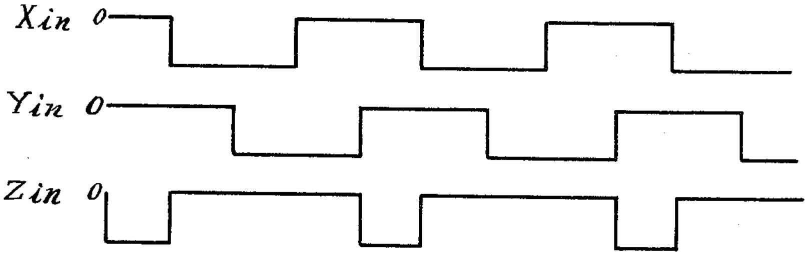
FIGURE 6 shows wave forms of a driving function which may be used to drive a bidirectional counter constructed in accordance with the present invention.

It will be noticed that the relative phasing of the driving signals $X_{in}$, $Y_{in}$ and $Z_{in}$ is as in a three phase system, and this type of input can be used to advantage. However, for some devices, such as incremental shaft encoders, the signals to be counted are often more easily generated as two signals varying in roughly a 90° phase relationship. This type of input can be accommodated by letting the two 90° signals by equivalent to signals $X_{in}$ and $Y_{in}$ and generating signal $Z_{in}$ as a function of $X_{in}$ and $Y_{in}$ according to the relationship:

$$Z_{in}=\overline{X_{in}+Y_{in}}$$

which requires a single NOR circuit. Referring to FIGURE 6 waveforms $X_{in}$ and $Y_{in}$ represent the two phase signal. Signal $Z_{in}$, developed from the above relationship, is seen to exist only whenever both of the signals $X_{in}$ and $Y_{in}$ do not exist. The three signals $X_{in}$, $Y_{in}$ and $Z_{in}$ are seen to be in three phase relationship and are suitable as such to drive a bidirectional counter constructed in accordance with the present invention.

While there has been described what are at present considered to be the preferred embodiment of this invention, it will be obvious to those skilled in the art that various changes and modifications may be made therein without departing from the invention, and it is therefore aimed to cover all such changes and modifications as fall within the true spirit and scope of the invention.

What is claimed is:

1. A positive memory bidirectional counter stage for a number system having the radix R comprising:
   - a multistable switching device arranged to form a stage of a counter and to switch through different stable states in response to an N state driving function where N is greater than 2,
   - said device having $R\times N$ electrical networks providing $R\times N$ stable states,
   - each of said networks adapted for receiving a plurality of input signals at input terminals thereof and for providing at an output terminal thereof an indication of a predetermined combination of input signals, and
   - circuit means for applying the N state driving function to each of the networks and for coupling the output terminal of each of said networks to an input terminal of a plurality of other networks in a manner for causing each of said networks to successively switch in a predetermined sequence for R occurrences of the driving function.

2. The counter stage of claim 1 wherein said networks comprise NOR circuits.

3. The counter stage of claim 1 wherein $R=2$ and a first half of the networks which are successively switched represent a binary "0" and a second half of the successively switched networks represent a binary "1."

4. The counter stage of claim 3 wherein $N=3$.

5. A positive memory bidirectional counter stage for a number system having the radix 2 comprising:
   - a multistable switching device arranged to form a stage of a counter and to switch through different stable states in response to a three-phase driving function,
   - said switching device having six NOR networks each adapted to receive at least four input signal levels at input terminals thereof and to provide at an output terminal thereof a first output voltage indication when at least one input signal is present and a second output voltage indication in the absence of input signal levels, and
   - circuit means for applying first, second and third component voltages of a three-phase driving function to input terminals of first, second and third pairs respectively of said NOR networks and for intercoupling said NOR network output and input terminals in a manner for causing each of said NOR networks to switch in a predetermined sequence between said first and second output voltage indications during two cycles of the three-phase driving function.

6. A positive memory bidirectional counter stage for a number system having a radix 2 comprising:
   - six NOR networks arranged to form a stage of a counter, said NOR networks each adapted to receive four input signal levels at input terminals thereof and to provide at an output terminal thereof a first output voltage indication when at least one input signal is present and a second output voltage indication in the absence of input signal levels,
   - circuit means for applying first, second and third phases of a three-phase driving function to input terminals of first and second NOR networks, third and fourth NOR networks, and fifth and sixth NOR networks respectively.
   - circuit means coupling an output voltage from said first NOR circuit to input terminals of second, fourth and fifth networks,
   - circuit means coupling an output voltage from the second to first, third and sixth networks,
   - circuit means coupling an output voltage from the third to second, fourth and sixth networks,
   - circuit means coupling an output voltage from the fourth to first, third and fifth networks,
   - circuit means coupling an output voltage from the fifth to first, fourth and sixth networks, and
   - circuit means coupling an output voltage from the sixth to the second, third and fifth networks.

7. A positive memory bidirectional counter having a number system having the radix R comprising:
   - a plurality of counter stages,
   - each stage including a multistable switching device for switching through different stable states in response to a N state driving function where N is greater than 2,
   - said switching device having $R\times N$ electrical networks provided $R\times N$ stable states,
   - each of said networks adapted for receiving a plurality of input signals at input terminal thereof and for providing at an output terminal thereof an indication of a predetermined combination of input signals,
   - circuit means for coupling the output terminals of each of said networks in a stage to an input terminal of a plurality of other networks in the stage in a manner for causing each of said networks to successively switch in a predetermined sequence for R occurrences of an N state driving function applied to the stage,
   - means for applying an N state input driving function to a first stage of said counter, and
   - means interposed between said plurality of counter stages for deriving an N state driving function from each counter stage and for coupling it to a next succeeding stage.

8. The counter of claim 7 where $R=2$.

9. The counter of claim 8 where $N=3$.

References Cited by the Examiner

UNITED STATES PATENTS

| | | | |
|---|---|---|---|
| 2,655,598 | 10/1953 | Eckert et al. | 235—175 |
| 3,017,093 | 1/1962 | Rowley | 235—92 |
| 3,017,099 | 1/1962 | Booth | 235—175 |
| 3,079,513 | 2/1963 | Yokelson | 307—88.5 |

OTHER REFERENCES

IBM Technical Disclosure Bulletin, vol. 4, No. 1, June 1961, pp. 44, 45.

MAYNARD R. WILBUR, *Primary Examiner.*

J. F. MILLER, *Assistant Examiner.*